United States Patent Office 3,467,632
Patented Sept. 16, 1969

3,467,632
METHOD OF MAKING MODIFIED BETA-PINENE RESIN AND RESULTANT PRODUCT
Bernard J. Davis, Houston, Tex., assignor to Reichhold Chemicals, Inc., White Plains, N.Y.
No Drawing. Filed Oct. 25, 1965, Ser. No. 505,192
Int. Cl. C08f 15/42
U.S. Cl. 260—80.7       9 Claims

ABSTRACT OF THE DISCLOSURE

This invention discloses the production of a hard resin polymer in solution. Olefinic streams containing piperylene or isoprene or mixtures thereof are blended with beta-pinene and subsequently reacted with the aid of a Friedel-Crafts catalyst at a temperature from about 0° C. to about 80° C. The quantity of beta-pinene used should be at least 5% by weight of the blend.

---

This invention relates to a resin composed of isoprene or piperylene or a mixture thereof and beta-pinene polymers and/or copolymers.

Other mono-olefins _____ 20–30

2-methyl butene-2 and piperylene (4-methyl butadiene 1,3) are produced individually or in mixture as a by-product in certain catalytic processes, such as processes of making butadiene or pure isoprene, particularly from petroleum fractions such as gas oil. As produced, a typical mixture of C–5 diolefins and olefins are so treated that the resultant stream consists of approximately:

|  | Percent |
|---|---|
| 2-methyl butene-2 | 35–40 |
| Piperylenes | 35–40 |

These olefin streams are unique in containing no or only traces of cyclopentadiene. As indicated above, the olefin stream normally contains a total of from 70 to 80% of piperylenes, the remainder being principally mono-olefins, this being a commercially available olefinic stream of relatively low cost as compared to the more expensive beta-pinene. Since the preferred olefin stream contains a larger proportion of piperylene than any of other components, it may be referred to hereinafter as the piperylene stream, though the piperylene may be substituted in whole or in part by isoprene or a mixture thereof. Thus, the olefin stream may vary from pure piperylene or pure isoprene to 2-methyl butene-2 or a mixture thereof. The original olefin feed stream may have the following typical constitution:

|  | Percent by weight |
|---|---|
| 3,3 dimethyl butene-1 | 1.11 |
| Trans pentene 2 | 5.85 |
| Cis pentene 2 | 3.09 |
| 2 methyl butene 2 | 35.80 |
| 4 methyl pentene-1 and 2,3 dimethyl butene-1 | 2.68 |
| Isoprene | 3.29 |
| 2 methyl pentene 1+cyclopentene | 2.24 |
| 2 methyl pentene 2+cyclohexene | 0.09 |
| Piperylene | 36.30 |
| Cyclopentadiene | 0.84 |
| Piperylene dimers | 8.72 |

The above material was used as the olefin component in the specific examples hereinafter set forth and referred to as piperylene stream. This material, when diluted with a hydrocarbon diluent such as heptane or toluol, and subjected to a polymerization reaction with Friedel-Crafts catalyst such as aluminum chloride, or its substantial equivalent as a catalyst, gives a yield of about 60% of a thermoplastic resin having a melt point of 80–85° C. It is extremely difficult to obtain higher softening points and maintain mineral spirit solubility at normal room temperatures.

I have discovered that a more useful product is obtained by polymerizing a mixture of the piperylene stream and beta-pinene to produce a soluble, thermoplastic resin.

Beta-pinene is a turpentine constituent giving a peculiarly high response to polymerization promoting stimuli, and particularly to polymerization with the acid-reacting metal metallic halides. It is present in substantial proportion in gum spirits of turpentine derived by tapping live conifers and by distillation of the liquids thus obtained, being present, in that turpentine in a proportion of about 30% thereof. It is also present in a proportion of about 25% of the whole in sulphate turpentine which is a liquid extracted from the waste produced in the process of making sulphate pulp from the wood of conifers. It has also been produced by a non-disclosed process developed by the Glidden Co., Jacksonville, Fla., by reforming alpha-pinene, a less reactive constituent of these same turpentines. Both the natural, and the synthetic beta-pinene are identical in structure, in chemical reactivity, and in resin producing properties. As commercially available from any of the above sources, the beta-pinene which is sold as such is about 80–95% pure, varying with the methods used in its separation from the associated monocyclic and bicyclic terpenes. It boils close to 165° C. and has an aniline point by the standard methods of aniline point determination of about 34° C.

As polymerized by itself by bringing it into reactive contact with aluminum chloride or an equivalent acid-reacting halide, the commercial beta-pinene, about 85% pure, gives an approximately 85% yield of terpene resin having a softening point (ball and ring) of from about 115° C. to 120° C. When brought to a state of approximate purity, the beta-pinene gives an approximately 100% yield of terpene resin having a softening point (ball and ring) of about 130° C. to 135° C. By mixing beta-pinene, in either an impure commercial exemplification of that material or a plant prepared beta-pinene over 95% pure, with the mixed piperylene stream, a yield of higher melting resin than is obtainable from the piperylene stream by itself and is obtained in a yield greater than that obtained from the piperylene stream itself. These advantages are noted in mixtures ranging from 10% beta-pinene to 70% beta-pinene.

As a general procedure, the piperylene stream is mixed with the beta-pinene and with an organic diluent, which is substantially inert to polymerization with the piperylene stream and the terpene, and is brought into reactive contact with an acid metal halide polymerization catalyst, such as anhydrous aluminum chloride, aluminum bromide, stannic chloride, titanium tetrachloride, antimony pentachloride, ferric chloride, vanadium tetrachloride, boron trifluoride or even sulfuric acid or phosphoric acid and the corresponding bromides of any of the metals listed, with aluminum chloride and aluminum bromide being preferred. During the progress to the polymerization reaction, the reaction temperature is maintained within a range which desirably is suitable for relatively rapid polymerization without reaction surge, such as a temperature within the approximate range of 0° C. to 80° C.; a temperature within the range of about 35° C. to 60° C. being considered optimum from the viewpoints of reaction speed and ease of temperature control. Upon the completion of catalyst addition, which desirably is effected without such rapidity as to cause a surge, agitation of the reaction mixture is continued for a substantial period of time to completely polymerize the piperylene stream components, some of which appear to lag in the combined polymerization reaction.

To remove the catalyst at the end of the polymerization treatment three standard recovery methods may be employed. In accordance with one such procedure the mixture is drowned with a 5% water solution of hydrochloric or phosphoric acid, and is then water washed and neutralized with a 10% water solution of sodium carbonate. The washed solution is warmed to 60° C. and is allowed to settle until a clear resin solution is obtained. Such resin solution is distilled desirably at a still temperature of about 210° C. and is then steam distilled at still temperatures within the range of about 210° C. to 260° C. until a resin of the desired softening point remains as a residue.

Another method of removing catalyst and recovering solid resin tends to give a somewhat lighter color than the method described above. In accordance with this latter procedure the polymerization mixture is allowed to settle until the metal halide sludge separates out, which separation is complete within about one hour to twenty-four hours. The solution is decanted off the sludge, is washed with a suitable organic solvent, such as refined solvent naphtha, and the washings are added to the resin solution. The combined resin solution thus obtained is clear, but is deep red in color due to the retention of a soluble complex of the metal halide. This clear, but highly colored solution is purified by refluxing it at a still temperature of about 140° C. to 150° C. with fuller's earth or attapulgus clay having but slight acidity, which is not of necessity dry, and slaked lime for a period of three hours. During this treatment, hydrochloric acid is driven off and the original soluble aluminum chloride complex comes down as a precipitate. An approximate quanitty of clay for use in the reflux purification is about 7.5% of the total beta-pinene-piperylene stream and a quantity of lime equal the clay, desirably is used. As low as 5% clay and lime may be used and as much may be used as will not interfere with the refluxing. Up to as much as 15% to 20% each of clay and lime is usable. After refluxing, the resin solution is filtered and a clear light yellow resin solution is obtained, one of the common commercial filter aids desirably being used during the filtration. This resin solution is then steam distilled, desirably at still temperatures of about 210° C. to 260° C. until a solid resin of the desired melting point remains as a residue.

The above recovery procedure results in the production of a resin of particularly light color, but does so at the sacrifice of a small proportion of the resin yield which is retained in sludge initially separated from the resin solution. This proportion of the resin carried down with the sludge may largely be recovered by drowning the sludge with a 5% solution of hydrochloric or phosphoric acid, then agitating the resin with an organic solvent, such as distilled solvent naphtha, filtering, then distilling off the solvent. This leads to recovery of entrapped resin which is of darker color than that obtained by steam distillation of the resin solution.

The third method employed in neutralizing and removing the catalyst is as follows: Subsequent to polymerization and a suitable hold time, a quantity of anhydrous lime or sodium sesqui carbonate, equal to 4 to 6 molar equivalents of the catalyst employed, is carefully added to the reaction mixture. This is stirred for 30 minutes and then cold water equal to ⅛ the volume of the reaction mixture is slowly added. Phase separation is complete and almost instantaneous. The spent catalyst as hydroxides and chloride salts form a clearly distinct and separate layer after intensive mixing is stopped. The upper oil layer is decanted, washed with water and then steam sparged as previously described.

It has been noted that the mixture of piperylene stream and beta-pinene is diluted with an organic solvent diluent inert to polymerization under conditions of the process. That diluent preferably is one of the low aniline point organic solvents which is inert in the process, as for example one of the aromatic hydrocarbon solvents which have no unsaturation outside the benzene ring, such as benzol, toluol, xylol, refined solvent naphtha and ethyl benzene, or one of the chlorinated aromatic solvents, such as chlorobenzol. Regardless of the specific solvent which is used, most desirably it is included in a quantity not substantially less than 30% of the total reaction liquid in order to maintain activity as polymer formation proceeds. It can be included in any greater quantity subject to the practical consideration that increased volume of diluent tends to slow the reaction and to increase the reaction time, and also to require that an increased quantity of catalyst be used in order to make reactive contact with the polymerizable piperylenes and beta-pinene. Also it is uneconomical to use and distill off more diluent, than performs a useful purpose during the polymerization reaction. As a practical consideration I prefer to include the diluent in no more than about 80% of the total volume of the reaction mixture.

I have found that in using anhydrous aluminum chloride or aluminum bromide as the polymerization catalyst as little as 1% by weight of such catalyst with respect to the combined weight of the piperylene or the like and beta-pinene is sufficient to effect complete polymerization, and even less than 1% may be usefully employed. Preferably I use anhydrous aluminum chloride or aluminum bromide in a quantity equal to 1½–15% of the weight of the combined piperylenes and beta-pinene in accordance with the other conditions of the process. Quantities of these catalysts over 25% effect no appreciable shortening in the time required for the polymerization reaction even when conduct of the polymerization at low temperatures indicates the use of a relatively large proportion of catalyst, unless a particularly great volume of diluent can also be used. In proportioning the catalyst to the polymerizable constituents of a reaction mixture the other metal halide catalysts of the Friedel-Crafts type which have been noted above can usefully be proportioned to the above preferred quantities of anhydrous aluminum chloride or aluminum bromide. In substituting aluminum bromide and the other metal halide catalysts for the aluminum chloride, the optimum proportion of the catalyst to the polymerizable content of the reaction mixture is desirably increased or decreased with respect to the quantity of aluminum chloride used in proportion as the molecular weight of that particular catalyst is greater or less than that of aluminum chloride.

It has been noted above that in subjecting a mixture of piperylenes and beta-pinene to polymerization, the beta-pinene functions in the mixture to raise the melting point of the resin which may be recovered. It is to be noted that this function is performed down to the least proportion of beta-pinene which gives a perceptible increase. That minimum proportion is, as will be exemplified herein, 10% beta-pinene in the mixture of that material with the piperylene stream as described above, if in fact there is any proportion which may be defined as the absolute minimum exerting no measurable effect on the product resin. For purposes of practical definition of the point at which the effect of including beta-pinene to a mixed piperylene stream becomes negligible, I give 5% as a minimum. In seeking to obtain resin of particularly high melt point, the proportion of beta-pinene to the piperylene stream can be increased for the production of high melting thermoplastic resin up to a point at which the proportion of beta-pinene becomes too high for economical reasons. This limit lies in the range of 70% beta-pinene, but there is no chemical or physical reason that the beta-pinene cannot constitute up to 95% of the mixture.

My starting material for polymerization thus comprises a mixture of beta-pinene and mixed piperylene stream in which the beta-pinene is from 10 to 70% of the total blend and most desirably in a proportion of 25% to 60% of the blend in order to obtain the maximum inclusion of the less expensive piperylenes without losing the unique tackifying properties and increased melt points imparted by the beta-pinene.

The followng will exemplify the method of my invention.

These resins thus produced are unique in being capable of replacing the pure beta-pinene resins in most applications. These piperylene-beta-pinene copolymers exhibit almost identical physical and chemical properties to the more costly pure terpenes. The following table compares a 50/50 beta-pinene-piperylene resin with a terpene polymer prepared from pure beta-pinene (95%) at the same melting point.

|  | Piperylene Copolymer | Beta-Pinene Polymer |
|---|---|---|
| Softening Point (B and R ° C.) | 100 | 100 |
| Gardner Color | 5 | 5 |
| Gardner Viscosity 70% in Toluol | T | T |
| Specific Gravity | 0.9425 | 0.9521 |
| Iodine Number (Wijs) | 148.7 | 150.0 |
| Bromine Number | 30.3 | 31.0 |
| Acid Number | 0.075 | 0.1 |
| Beilstein Test | (¹) | (¹) |

¹ Negative.

Both resins exhibit identical characteristic tack on rubbing between the fingers.

EXAMPLES I–XII

| Ex. | Beta Pinene, Grams | Piperylene Stream, Grams | Catalyst (AlCl₃), Grams | Xylol, Grams | Lime, Grams | Ball and Ring Softening Point, ° C. | Percent Yield based on Monomers |
|---|---|---|---|---|---|---|---|
| I |  | 100 | 1½ | 30 | 3.8 | 82 | 80.0 |
| II | 5 | 95 | 1½ | 30 | 3.8 | 85 | 82.2 |
| III | 10 | 90 | 1½ | 30 | 3.8 | 88 | 84.5 |
| IV | 20 | 80 | 1½ | 30 | 3.8 | 93 | 86.5 |
| V | 30 | 70 | 1½ | 30 | 3.8 | 95 | 88.7 |
| VI | 40 | 60 | 1½ | 30 | 3.8 | 99 | 89.9 |
| VII | 50 | 50 | 1½ | 30 | 3.8 | 100 | 94.1 |
| VIII | 60 | 40 | 1½ | 30 | 3.8 | 110 | 95.2 |
| IX | 70 | 30 | 1½ | 30 | 3.8 | 115 | 96.2 |
| X | 80 | 20 | 1½ | 30 | 3.8 | 120 | 97.3 |
| XI | 90 | 10 | 1½ | 30 | 3.8 | 130 | 98.2 |
| XII | 100 |  | 1½ | 30 | 3.8 | 135 | 100 |

All of the foregoing resins were run identically. The beta-pinene (95%) was premixed with the piperylene stream where applicable. All streams were predried with a molecular sieve. The xylol and all of the catalyst were added to the flask under dry nitrogen and the inert blanket was maintained thruout the reaction. The xylol catalyst mixture was cooled by an ice bath to 10° C. and the monomer mix added at such a rate as to maintain a maximum of 20° C. After all catalyst was in, the mixture was held at 30° C. for 1 hour. Lime was added and stirred 15 minutes. Water was then added (⅓ reaction mixture) slowly to prevent exothermic boiling and stirred 15 minutes. The stirrer was stopped and the layers allowed to separate. The pale yellow oil layer on top was decanted by flooding off by means of an inserted water tube and washed twice with warm water (70° C.). The resultant oil layer was then stripped by distillation to 210° C. with the aid of a nitrogen sparge and subsequently steam stripped to 260° C. to yield the resin of indicated melt point.

I claim:

1. A method of producing a hard resin polymer in solution which comprises blending (1) an olefinic stream containing a major proportion of at least one member of a group consisting of piperylene, isoprene, and mixtures thereof with (2) beta-pinene, and reacting the blend of (1) and (2) with the aid of Friedel-Crafts catalyst to form a resin polymer in solution in the presence of an inert solvent diluent the amount of beta-pinene being at least 5% by weight based on the blend and the blending taking place at a temperature within the approximate range of 0° C. to 80° C.

2. The method as defined in claim 1 wherein (1) is piperylene.

3. The method as defined in claim 1 wherein (1) is isoprene.

4. The method as defined in claim 1 wherein (1) is equal to about 10 to 70% by weight of the blend of (1) and (2).

5. The method according to claim 1 wherein (1) is equal to about 25 to 70% by weight of the blend of (1) and (2).

6. The resin solution produced in accordance with claim 1.

7. A method of producing a hard resin polymer in solution which comprises blending (1) an olefinic stream containing a major proportion of at least one member of a group consisting of piperylene, isoprene, and mixtures thereof with (2) beta-pinene, reacting the blend of (1) and (2) with the aid of Friedel-Crafts catalyst to form a resin polymer in solution in the presence of an inert solvent diluent, the amount of beta-pinene being at least 5% by weight based on the blend and the blending taking place at a temperature within the approximate range of 0° C. to 80° C. and recovering the resin polymer from said solution.

8. The resin solution produced in accordance with claim 7.

9. The method according to claim 1 wherein the blending takes place within the approximate range of 35° C. to 60° C.

References Cited

UNITED STATES PATENTS 2,685,575  8/1954  Heiligmann _____ 260—83.7
2,373,706  4/1945  Ott _____ 260—93.3
2,567,919  9/1951  Burroughs _____ 260—93.3

OTHER REFERENCES

Friedel-Crafts and Related Reactions, Vol. I, ed. by George A. Olah, 1963, Interscience Publishers (pp. 192–193).

JOSEPH L. SCHOFER, Primary Examiner

R. S. BENJAMIN, Assistant Examiner

U.S. Cl. X.R.

260—80.78, 82, 88.2